W. J. ADAM.
TRUCK.
APPLICATION FILED NOV. 27, 1911.

1,083,422.

Patented Jan. 6, 1914.

Witnesses.
Wm. M. Rheem
H. D. McPhail

Inventor
William J. Adam
by Phillips Van Everen & Fish
Attys

UNITED STATES PATENT OFFICE.

WILLIAM J. ADAM, OF NORWOOD, MASSACHUSETTS, ASSIGNOR, BY MESNE ASSIGNMENTS, TO PLIMPTON PRESS, OF NORWOOD, MASSACHUSETTS, A CORPORATION OF MASSACHUSETTS.

TRUCK.

1,083,422.  Specification of Letters Patent.  Patented Jan. 6, 1914.

Application filed November 27, 1911. Serial No. 662,631.

*To all whom it may concern:*

Be it known that I, WILLIAM J. ADAM, a citizen of the United States, residing at Norwood, in the county of Norfolk and State of Massachusetts, have invented certain new and useful Improvements in Trucks; and I do hereby declare the following to be a full, clear, and exact description of the invention, such as will enable others skilled in the art to which it appertains to make and use the same.

The present invention relates to trucks, and more particularly to trucks which are provided with mechanism for elevating the table of the truck to facilitate the loading and unloading of material carried thereon.

The object of the present invention is to provide a truck of this character which will support a heavy load, and which may be readily manipulated by the operator to raise the load through a considerable vertical distance.

With this end in view, the various features of the invention consist in certain novel features of construction, combinations and arrangement of parts hereinafter described and claimed, the advantages of which will be apparent to those skilled in the art from the following description.

Figure 1:
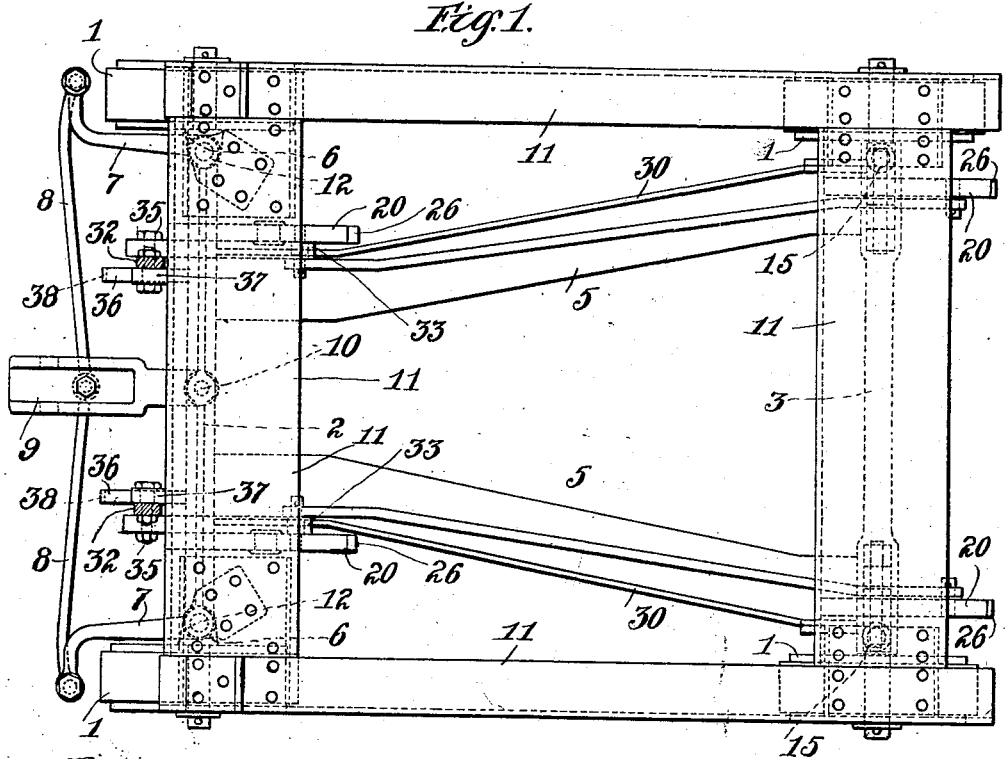
Figure 2:
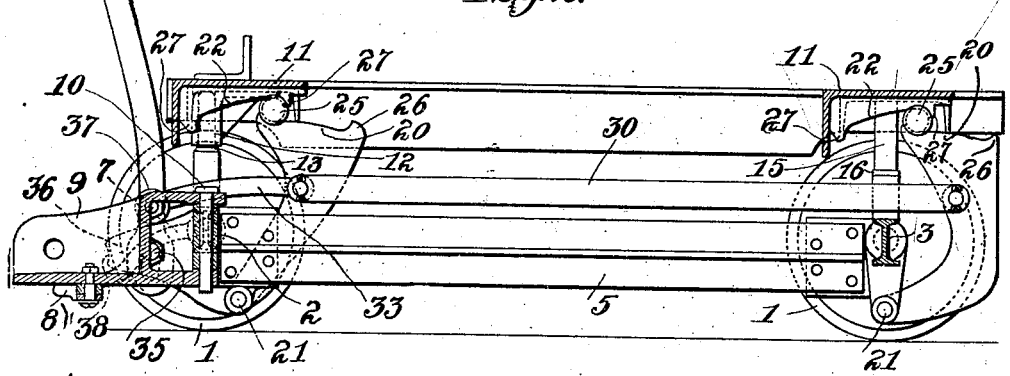

In the accompanying drawings illustrating the preferred form of the invention, Figure 1 represents a plan view of a truck embodying the improved elevating mechanism, and Fig. 2 is a longitudinal section in elevation of the truck shown in Fig. 1.

The truck shown in the illustrated embodiment of the invention may be employed for conveying paper or other material or articles to different parts of a printing or manufacturing establishment. In conveying paper, for instance, the paper is carried upon a board which is supported upon the table of the truck with its ends projecting over the sides of the truck, and in order to remove the load the table is elevated, allowing the projecting ends of the board to pass over a pair of supporting members between which the truck is moved. After the platform has been positioned above the supporting members, the table is lowered and the truck may then be removed without disturbing the board which is retained in position by the supporting members. The truck is loaded in a like manner by first positioning it beneath the board and then elevating the table of the truck to lift the board from the supporting members.

The truck is mounted upon four wheels indicated at 1, and is provided with a front axle 2 and a rear axle 3 rigidly connected together by a pair of longitudinal braces 5. The truck is guided by turning the front wheels, which are pivoted to opposite ends of the axle 2 by steering knuckles 6. A pair of arms 7 extend forward from the steering knuckles 6 and the arms are connected to a tongue 9 by links 8. The tongue is fastened to the front axle 2 by a pivot bolt 10 and is provided with a handle (not shown) for controlling the movements of the truck.

The above described portion of the truck forms a rigid support upon which the table rests, and may be conveniently referred to hereinafter as the chassis of the truck.

The truck is provided with a skeleton table or bed which is formed by a plurality of angle irons 11 rigidly connected together at their opposite ends. In order to secure the table against horizontal movement either longitudinally or sidewise, but to allow a free vertical movement, the two front corners of the table have recessed bosses 12 depending therefrom which slidingly engage with vertical studs 13 mounted upon opposite ends of the front axle. The rear corners of the table have studs 15 depending therefrom which engage with upstanding stop members 16 mounted upon the rear axle to limit the downward movement of the table. In Fig. 2 the table is shown in its lowermost position with the stop members in contact supporting the rear end of the table.

It is desirable that the elevating mechanism be capable of elevating a comparatively heavy load with the application of a small pressure upon the operating lever, and that the range of vertical movement through which this load is lifted should be as great as possible. To this end the elevating mechanism consists of four cam segments indicated at 20, which are pivotally connected to the four corners of the chassis at 21, and each of which coöperates with a wedge shaped cam 22 formed upon the under side of the table. The cam segments 20 are oscillated relative to the cams 22 to raise or lower the table, and in order to facilitate the operation of the cams a roll 25 is inserted between each pair of cams 20 and 22. The roll is retained in position between the two cams by a pair of upstanding projections 26 formed upon the cam 20 and a corresponding pair of projections 27 formed upon the cam 22. In order to move the cam segments 20 in unison, each pair of front and rear segments are rigidly connected together by a link 30. The operating lever for moving the cam segments is indicated at 32, and consists of a bail-shaped handle pivoted to the chassis and connected to each of the front segments by a link 33. With this construction and arrangement of parts, upon depressing the operating lever 32 a powerful pressure is exerted to lift the table, raising the same evenly and uniformly with a minimum of friction between the operating parts.

The elevating device is actuated by a toggle which consists of the operating lever pivoted to the chassis and a link connecting the lever and elevating device adjacent the fulcrum of the lever. As the lever is depressed to straighten the toggle the fulcrum of the lever is shifted to increase the distance between the fulcrum and the link connection and thus increase the resultant movement imparted to the elevating cams. In the simplest and most efficient form of the invention which has yet been devised the lever is pivoted slidingly to the chassis, and a cam serves to shift the fulcrum of the lever and increase the distance between the fulcrum and the link as the lever is depressed. The lower ends of the lever 32 are slotted, as indicated clearly in Fig. 2, and a projecting stud 35 engages with each slot. This pin-and-slot connection is located adjacent to the pivotal connection of the link 33 with the lever and enables the distance between the fulcrum of the lever and the link to be varied. In order to shift the fulcrum of the lever 32 as the lever is depressed a pair of cam plates 36 are secured to the chassis and engage with coöperating cam rolls 37 journaled upon the operating lever in axial alinement with the pivotal connections of the link 33. The table is locked in its elevated position by recesses 38 which are formed in the front sides of the cam plates 36 and engage with the cam roll 37 when the operating lever 32 is depressed.

The operation of the elevating mechanism is as follows: When it is desired to elevate the table in order to either load or unload the truck, the operating lever 32 is depressed. The initial position of the operating lever is that shown in Fig. 2, and in this position the fulcrum of the lever is located in close proximity to the connection of the links 33 and a long leverage is obtained, thus exerting a powerful pressure to raise the table with the application of a comparatively small force upon the operating lever. The depression of the lever straightens the toggle consisting of the lever 32 and the links 33, and as the toggle is straightened, the same pressure is exerted to raise the table with the application of a correspondingly diminished force upon the operating lever. To utilize this feature the cam plates 36 shift the fulcrum of the operating lever to shorten the leverage as the lever is depressed, thus exerting a constant pressure to raise the table with the application of a substantially constant force upon the operating lever through the entire range of movement of the lever, and the operator is enabled to obtain the maximum extent of movement of the table with a minimum throw of the operating lever.

While it is preferred to employ the specific construction and arrangement of parts shown and described, it will be understood that this construction and arrangement is not essential except so far as specified in the claims, and may be changed or modified without departing from the broader features of the invention.

Having thus described the invention, what is claimed is:—

1. A truck, having, in combination, a chassis, a table supported thereon, an elevating device, a lever pivoted to the chassis, a link connecting the lever and elevating device and forming a toggle with the lever, and means for increasing the distance between the link connection and the fulcrum of the lever to shorten the leverage as the toggle is straightened, substantially as described.

2. A truck, having, in combination, a chassis, a table supported thereon, an elevating device, a lever pivoted to the chassis, a link connecting the lever and elevating device and forming a toggle with the lever, and a cam operatively connected to the lever and arranged to increase the distance between the link connection and the fulcrum of the lever to shorten the leverage as the lever is depressed, substantially as described.

3. A truck, having, in combination, a chassis, a table supported thereon, an elevating device, an operating lever having a pin-and-slot connection with the chassis, a link connecting the lever and elevating device adjacent to the fulcrum of the lever, and a cam arranged to increase the distance between the link connection and the fulcrum of the lever as the lever is depressed to actuate the elevating device, substantially as described.

4. A truck, having, in combination, a chassis, a table supported thereon, an elevating device, an operating lever pivoted to the chassis, a link connecting the lever and elevating device, and means for securing a relative movement of the fulcrum of the lever and the link to increase the distance between the fulcrum and link as the lever is depressed, substantially as described.

5. A truck, having, in combination, a chassis, a table supported thereon, an elevating device, an operating lever pivoted to the chassis, connections between the lever and elevating device, and a cam for shifting the lever as it is depressed having a recess arranged to retain the lever in its depressed position and hold the table elevated, substantially as described.

6. A truck having, in combination, a chassis, a table supported thereon for vertical movement, a wedge-shaped cam secured to the under side of the table, a cam segment pivoted to the chassis and coöperating with the wedge-shaped cam, and a roll interposed between the faces of the two cams, the cams having projections formed thereon to retain the roll in its operative position, substantially as described.

7. A truck having, in combination, a chassis, a table supported thereon, an elevating device, a stud secured to the chassis, a lever having a slotted lower end engaging with the stud, a link connecting the lever and elevating device, and a cam for shifting the lever as it is depressed to increase the distance between the link connection and the fulcrum of the lever, substantially as described.

8. A truck, having, in combination, a chassis, a cam mounted on the chassis, a vertically movable table, a cam mounted on the table and adapted to coöperate with the cam on the chassis, a freely traveling roll between the working surfaces of the two cams, means for guiding the table in a vertical line, and mechanism under the control of the operator for moving one of the cams to raise or lower the table as desired.

9. A truck, having, in combination, a chassis, cam segments pivoted on the chassis, a vertically movable table provided on its under side with bearing surfaces coöperating with the cam segments, a freely traveling roll between each cam segment and the opposed bearing surface, vertical guides for the table, and an operating lever pivoted on the chassis and connected with the cam segments.

10. A truck, having, in combination, a chassis, a vertically movable table, vertical guides for the table, wedge shaped cams secured to the under side of the table, coöperating cam segments mounted on the chassis, a freely traveling roll between each cam segment and the coöperating wedge shaped cam, and an operating lever connected with the cam segments.

11. A truck, having, in combination, a chassis, a vertically movable table, vertical guides for the table, wedge shaped cams secured to the under side of the table, coöperating cam segments pivoted to the chassis, a freely traveling roll between each cam segment and the coöperating wedge shaped cam, an operating lever pivoted on the chassis, and links connecting the cam segments with each other and with the lever.

WILLIAM J. ADAM.

Witnesses:
 FRED R. ELLIS,
 MAUDE M. MILLER.

---

Copies of this patent may be obtained for five cents each, by addressing the "Commissioner of Patents, Washington, D. C."